W. M. MASON.
Apparatus for Sweating Hides or Skins.
No. 145,436. Patented Dec. 9, 1873.
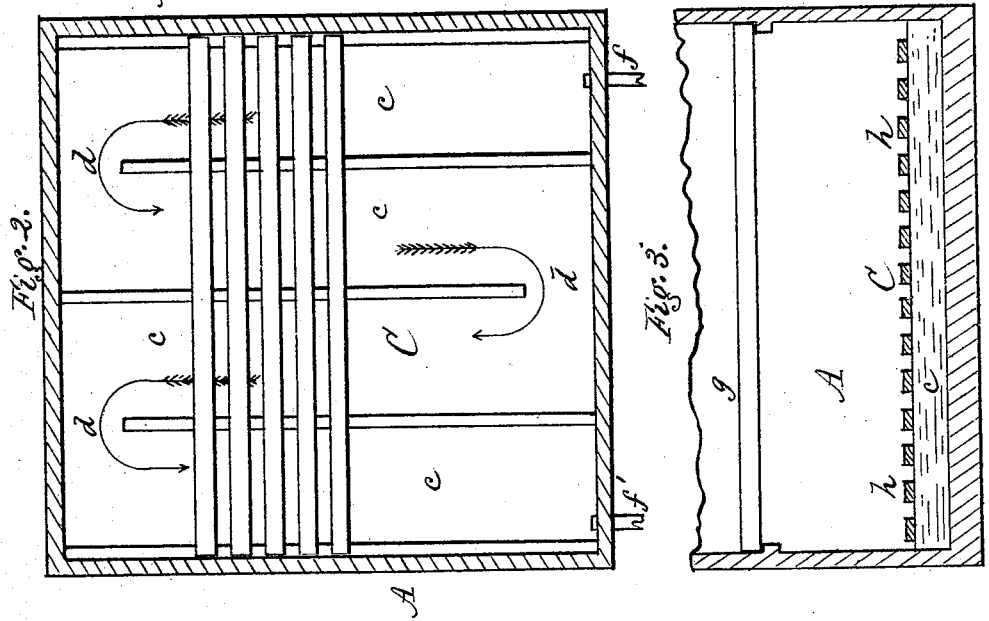
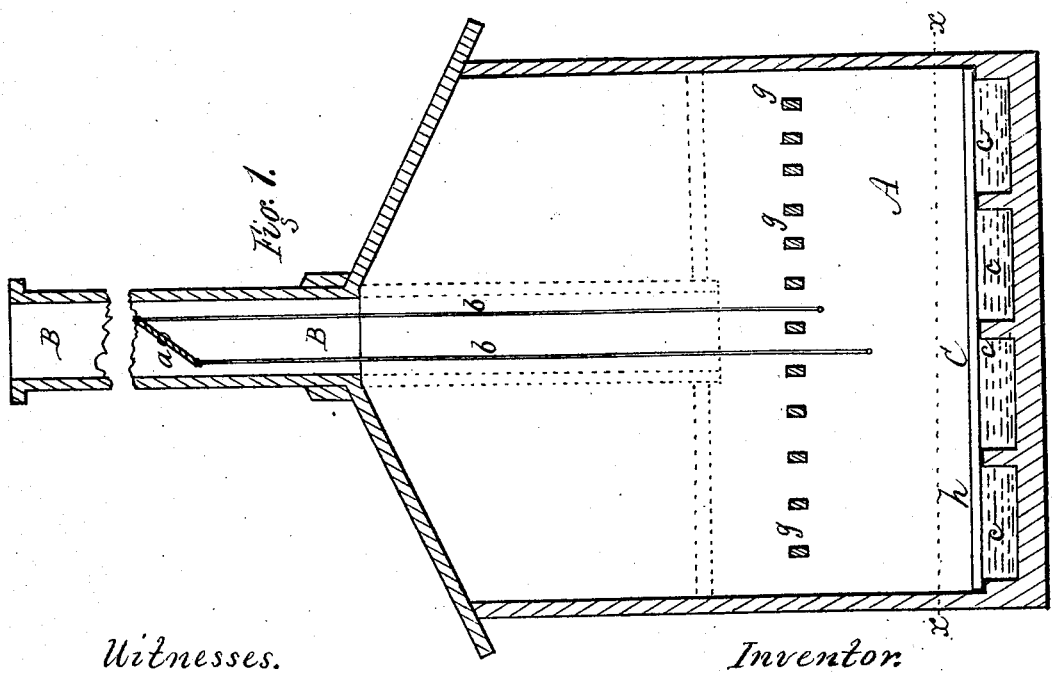

UNITED STATES PATENT OFFICE.

WILLIAM M. MASON, OF BUFFALO, NEW YORK.

IMPROVEMENT IN APPARATUS FOR SWEATING HIDES OR SKINS.

Specification forming part of Letters Patent No. 145,436, dated December 9, 1873; application filed July 21, 1873.

*To all whom it may concern:*

Be it known that I, WILLIAM M. MASON, of the city of Buffalo, in the county of Erie and State of New York, have invented a certain new and useful Improvement in Apparatus for Sweating Hides and Skins; and I do hereby declare that the following is a full, clear, and exact description of the same.

In the drawings, Figure 1 is a sectional elevation of a building embodying my improvements. Fig. 2 is a horizontal section in line $x$ $x$. Fig. 3 is a vertical section at right angles to Fig. 1.

This invention consists of a vault or apartment having a ventilator provided with a regulating-valve, and a water-floor consisting of a series of communicating-troughs, arranged and operating as hereinafter described, for the purpose of softening dry hides and sweating the same.

In the drawings, A represents a building of any kind, and B is a ventilator at the top. If the whole building is used as the vault, the ventilator simply extends from the top, as in black lines, Fig. 1; but, if only one story is used, the ventilator is extended below and passed through the flooring, as shown by the dotted lines, thereby leaving the upper story or stories free for other uses. A valve, $a$, is preferably hung in the ventilator at any point, and provided with cords $b$ $b$, by which it is operated. The use of the valve is to graduate the escape of the current from the interior, by closing more or less of the ventilator space. Any desired number of the ventilators may be used, and they may be extended to any desired height, the latter being preferably considerable to produce an active ventilation. A water-floor, C, is employed, to which is applied water to produce the evaporation. I prefer the form shown, which consists of a series of troughs or water-ways, $c$ $c$ $c$, open at alternate ends, as shown at $d$ $d$, so as to form a zigzag water communication around, as indicated by the arrows in Fig. 3. The water enters by an induction-pipe, $f$, at one end, and escapes by an eduction-pipe, $f'$, at the other end. This current or flow of the water is essential to discharge such gases as are absorbed by the water and keep the water pure. Either fresh or salt water may be employed; but the latter is preferable, especially in hot weather, as it produces a colder atmosphere, and the salt acts as a preservative to the hides in sweating. A different arrangement of the water-floor and its troughs may be used, and the throwing or spraying of the water on the floor might be used with a similar effect. $g$ $g$ $g$ are the slats or poles for hanging the hides. $h$ $h$ $h$ are slats laid as a flooring over the water-troughs, with interstices left between to allow the evaporation.

By the means above described, I produce cold sweating in contradistinction to the warm sweating heretofore practiced. By so doing the requisite dampness is always obtained without any danger of heating and spoiling the hides. The ammonia and gases are all carried off as fast as they are generated, thus removing at once the great cause of putrefaction. There is, consequently, no loss of the hides from this source, and but little care or time is necessary in conducting the operation.

Any arrangement of doors, windows, or other apertures or entrances may be used, and the vault may be so arranged that an opening may be made in the same at the bottom at any time, for the purpose of admitting air to assist the ventilating action when the atmosphere is heavy, as is sometimes the case.

I claim—

In an apparatus for sweating hides, the ventilator B with valve $a$, and the water-floor C with troughs $c$ $c$ $c$, when combined with the vault or apartment A, in the manner and for the purpose specified.

In witness whereof I have hereunto signed my name in the presence of two subscribing witnesses.

WM. M. MASON.

Witnesses:
R. F. OSGOOD,
FRED. A. HATCH.